(12) United States Patent
Zeng et al.

(10) Patent No.: US 11,599,008 B2
(45) Date of Patent: Mar. 7, 2023

(54) CAMERA MATTE BOX WITH ELECTRICALLY CONTROLLED FILTER

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 276 days.

(21) Appl. No.: 16/896,165

(22) Filed: Jun. 8, 2020

(65) Prior Publication Data

US 2021/0382373 A1 Dec. 9, 2021

(51) Int. Cl.
| | |
|---|---|
| G03B 11/04 | (2021.01) |
| G03B 17/12 | (2021.01) |
| G03B 17/56 | (2021.01) |
| G02B 7/00 | (2021.01) |

(52) U.S. Cl.
CPC ............ *G03B 11/045* (2013.01); *G02B 7/006* (2013.01); *G03B 17/12* (2013.01); *G03B 17/566* (2013.01)

(58) Field of Classification Search
CPC .... G03B 11/045; G03B 17/12; G03B 17/566; G02B 7/006

USPC ........................................................ 359/534
See application file for complete search history.

(56) References Cited

U.S. PATENT DOCUMENTS

| | | | | | |
|---|---|---|---|---|---|
| 5,564,817 | A | * | 10/1996 | Palmer .................. | F16M 13/02 |
| | | | | | 362/191 |
| 2018/0278817 | A1 | * | 9/2018 | Shimizu .................. | G02B 7/14 |
| 2019/0241130 | A1 | * | 8/2019 | Wietkamp ........... | H04N 5/2252 |
| 2020/0073214 | A1 | * | 3/2020 | Yamazaki ............ | G03B 17/565 |

FOREIGN PATENT DOCUMENTS

| | | | | | |
|---|---|---|---|---|---|
| GB | 2523063 | * | 8/2015 | ............ | B03B 17/12 |
| GB | 2534577 | * | 8/2016 | ............ | H04N 5/232 |

* cited by examiner

*Primary Examiner* — Lin Ye
*Assistant Examiner* — Chan T Nguyen
(74) *Attorney, Agent, or Firm* — Loza & Loza, LLP; Derek Yeung (57) ABSTRACT

A camera matte box electrically controls an adjustable lens filter. The camera matte box includes a body, at least one adjustable flap, a filter holder, a changeable lens adapter, and an electrical filter control module. The electrical filter control module adjusts a position of the adjustable filter according to a command received using a communication interface. The filter holder removably holds the adjustable filter and a non-adjustable filter in the body.

12 Claims, 10 Drawing Sheets

CAMERA MATTE BOX WITH ELECTRICALLY CONTROLLED FILTER

TECHNICAL FIELD

The present disclosure relates generally to a camera matte box, and in particular, a camera matte box with an electrically controlled adjustable filter.

INTRODUCTION

A matte box is commonly used with a camera to provide light shielding and protection to a camera lens to which the matte box is attached to. A matte box may also be called a lens hood in some applications. A matte box can block undesirable light or non-image forming light in one or more directions to reduce lens flare and/or glare during shooting. The matte box can also provide protection to the lens to avoid physical damage. The matte box can include a filter mount or holder for installing a filter to achieve a desired cinematographic or photographic effect. Matte boxes can be categorized into heavy matte boxes and light matte boxes according to their sizes and supported filter sizes (e.g., 4×5.65 inch filter, 6×6 inch filter, 4×4 inch filter, etc.). Conventional matte boxes are limited in functionality and filter installation methods. For example, a current matte box may mount a filter using a drawer frame or thread-locking mechanism. These filter mounting mechanisms are complicated and bulky, and add a heavy load on the camera and the lens. Using such matte boxes can negatively impact the efficiency of the photographer. Furthermore, conventional matte boxes are not flexible in filter sizes and mounting types. Therefore, a conventional matte box generally cannot be used with camera lenses and/or filters with different apertures or sizes.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a camera matte box with an electrically controlled adjustable filter. The matte box includes a body, at least one adjustable flap (e.g., a fin, fender, French flag), a filter holder for holding one or more filters, a changeable lens adapter, and an electrical filter control module. The electrical filter control module adjusts a position of the adjustable filter according to a command received using a communication interface of the electrical filter control module.

In one aspect, a camera matte box includes a body, an adjustable filter removably mounted on the body, and an electrical filter control module configured to adjust a position of the adjustable filter. The electrical filter control module may include a controller, a motor controlled by the controller, and a motor output coupled to the motor to adjust the position of the adjustable filter. The motor output includes a gear that meshes with a gear of the adjustable filter. The motor output may be configured to rotate the adjustable filter for a predetermined degree based on a command received by the controller.

In one aspect, the camera matte box further includes a filter holder that is removably attached to the body. The filter holder is configured to hold the adjustable filter in the camera matte box. In one aspect, the camera matte box further includes a lens adapter for removably connecting the filter holder to a camera lens.

In one aspect, the body includes a retainer on a first side and at least one lock on a second side opposite the first side. The retainer and the at least one lock are configured to secure the filter holder in the matte box.

In one aspect, the filter holder is configured to removably hold a non-adjustable or fixed-function filter in the camera matte box. The adjustable filter and the non-adjustable filter are aligned in an axial direction toward the camera lens.

In one aspect, the lens adapter has a first end and a second end. The first end is removably received in a cavity of the filter holder, and the second end includes an external thread for coupling with an internal thread of the camera lens.

In one aspect, the filter holder includes a fastener operable to fasten the first end of the lens adapter in the cavity of the filter holder.

In one aspect, a camera filter control apparatus includes a controller configured to receive a command for controlling an adjustable filter in a camera matte box. The camera filter control apparatus further includes a motor controlled by the controller. The camera filter control apparatus further includes a motor output connected to the motor, for electrically adjusting a position of the adjustable filter according to the command.

In one aspect, an adjustable filter includes a housing, a filter element rotatably installed in the housing, and a gear transmission mechanism. The adjustable filter can be installed in a camera matte box. The gear transmission mechanism is at least partially contained in the housing, and the gear transmission mechanism is rotatably coupled to the filter element for adjusting a position of the filter element.

In one aspect, a method of operating a matte box for a camera lens is disclosed. An adjustable filter is removably installed in the matte box. The matte box receives a command for adjusting the adjustable filter. The matte box electrically can adjust a position of the adjustable filter according to the command.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In a similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Aspects of the present disclosure provide a camera matte box that can electrically control an adjustable filter to achieve various imaging effects during shooting. The camera matte box has a structural design that makes it easy to operate and reduces weight and stress on the camera and lens. The camera matte box can use multiple filters of various sizes and can be adapted to connect with lenses of various sizes.

Figure 1:
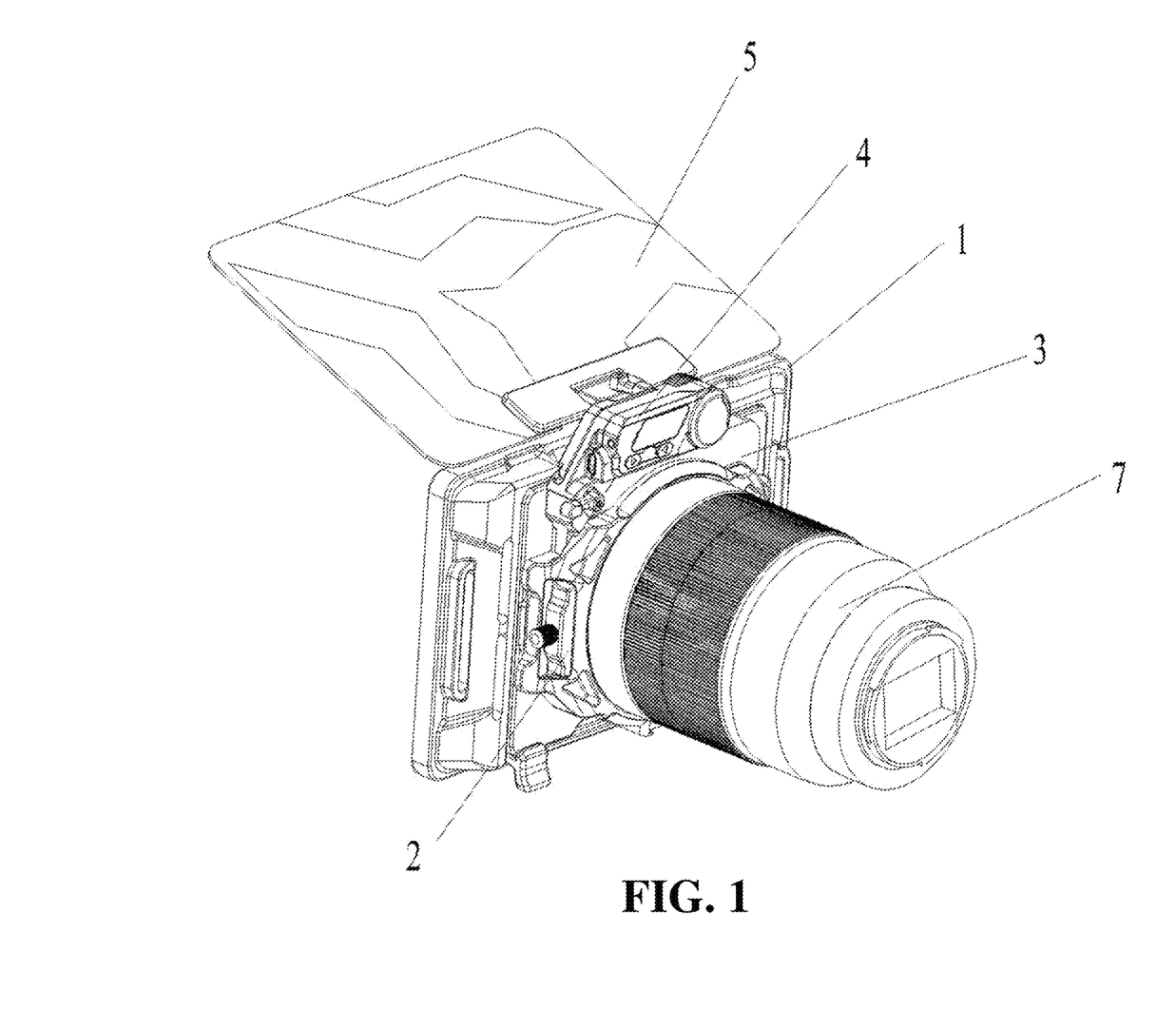
FIG. 1 is a drawing illustrating a matte box installed on a camera lens according to one aspect.
Figure 2:
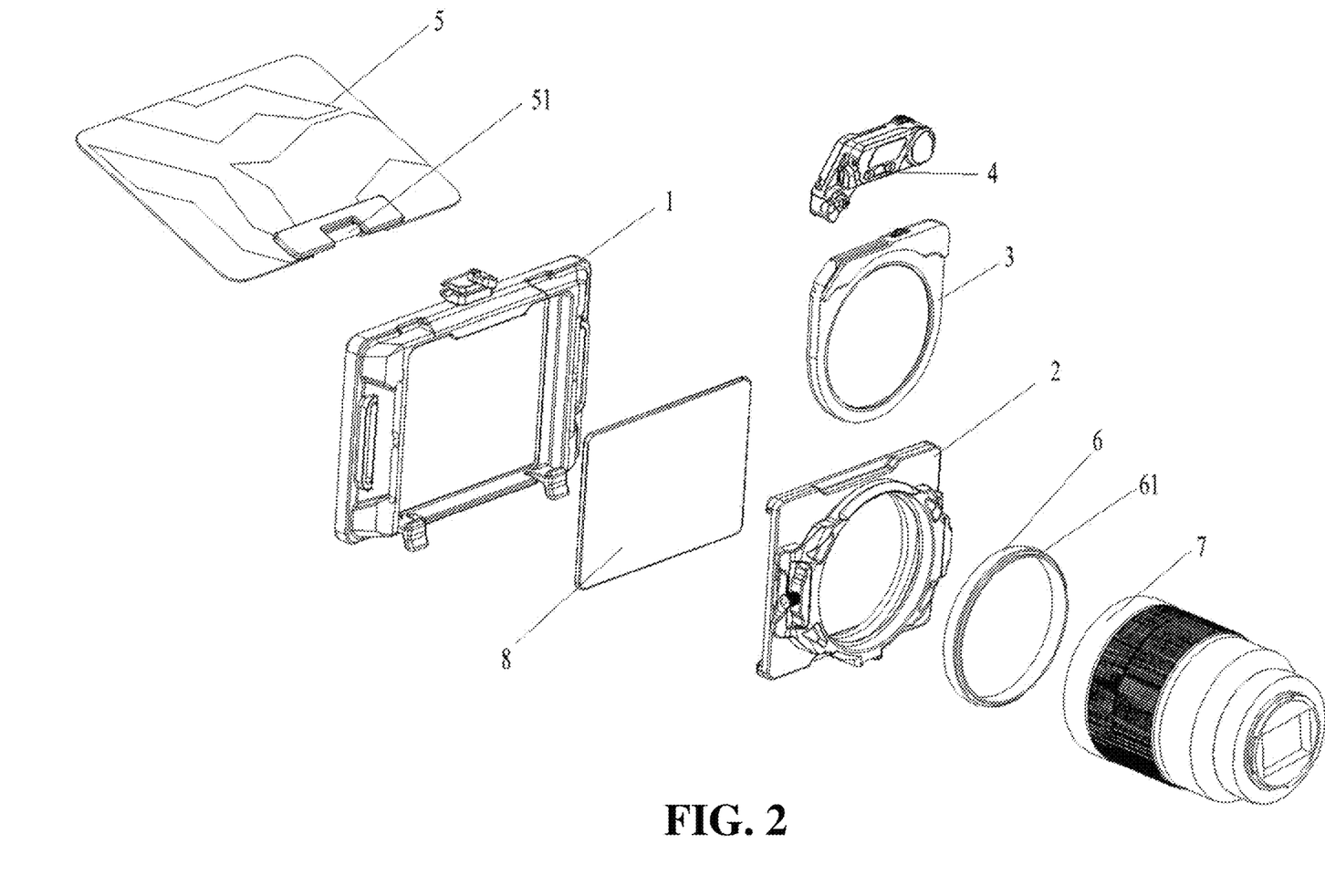
FIG. 2 is a drawing illustrating an exploded view of the matte box of FIG. 1.

Referring to the drawings, a camera matte box includes a body 1, a filter holder 2, an adjustable filter 3, an electrical filter control module 4, at least one flap (e.g., flap 5), a changeable lens adapter 6 for connecting the camera matte box with a lens 7. The changeable lens adapter 6 can connect the matte box to the camera lens 7. Referring to FIG. 2, one side of the flap 5 is provided with a rotation shaft 51 (e.g., rod, bar, etc.) that can be rotatably and removably attached to an attachment mechanism on the body 1. In one example, the attachment mechanism may include a clamp that is operable to rotatably secure the shaft 51 to the body 1. In one aspect, the clamp has an upper claw 11 and a lower claw 12 that together form a cavity, space, or slot (e.g., cylindrical cavity) for rotatably receiving and retaining the shaft 51 therein. A handle, knob, or switch 13 on the upper claw 11 can be operated (e.g., rotated) to control the opening and closing of the clamp (e.g., formed by the upper claw 11 and lower claw 12) to allow the removal and installation of the flap 5. The handle 13, upper claw 11, and lower claw 12 provide the mechanism for securing and installing the flap 5 onto the body 1. When the flap 5 is attached to the body 1, the rotation shaft 51 allows the flap 5 to be adjusted in various angles with respect to the body 1, thereby controlling the desired amount of light entering the camera matte box.

In one aspect, the matte box may have one or more wind guides (e.g., wind guide 14) on one or more sides (e.g., left and right sides) of the body 1 for directing air flow and/or reducing air resistance or drag.

Figure 8:
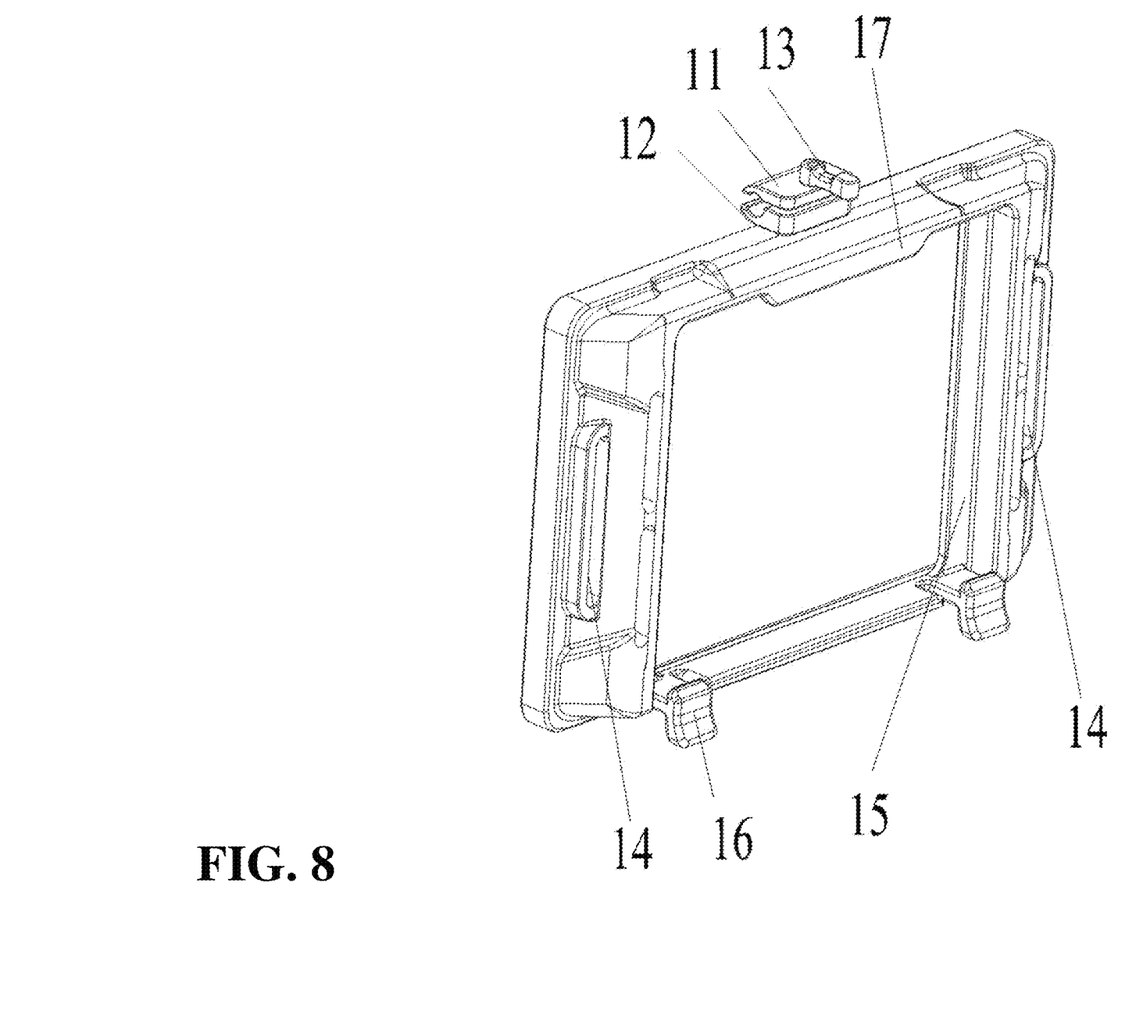
FIG. 8 is a drawing illustrating a perspective view of a body of the matte box of FIG. 1 according to one aspect.

In one aspect, the body 1 may have one or more elastic locks 16 and a retainer 17 respectively located on opposite sides of the body 1. The elastic lock 16 is made of a resilient, flexible, or bendable material (e.g., plastic or rubber). The elastic locks 16 together with a retainer 17 securely hold the filter holder 2 in a cavity 15 of the body 1. To install the filter holder 2 into the body 1, a top edge of the filter holder 2 is tilted toward the top side of the body 1, and a portion (e.g., a depressed portion 21) on the top side of the filter holder 2 goes under the retainer 17 of the body 1. Then, the filter holder 2 is rotated using the top end and the retainer 17 as the pivot, and the bottom end of the filter holder 2 is pressed toward the elastic locks 16. The elastic locks 16 are deformable by the pressure and bend downward to allow the filter holder 2 to fully seat in the cavity 15 of the body 1. After the filter holder 2 is installed into the cavity 15, the elastic locks 16 return to their initial shape and position, such that the filter holder 2 is secured in the cavity 15 by the elastic locks 16 and the retainer 17 positioned on opposite sides of the filter holder 2.

Figure 7:
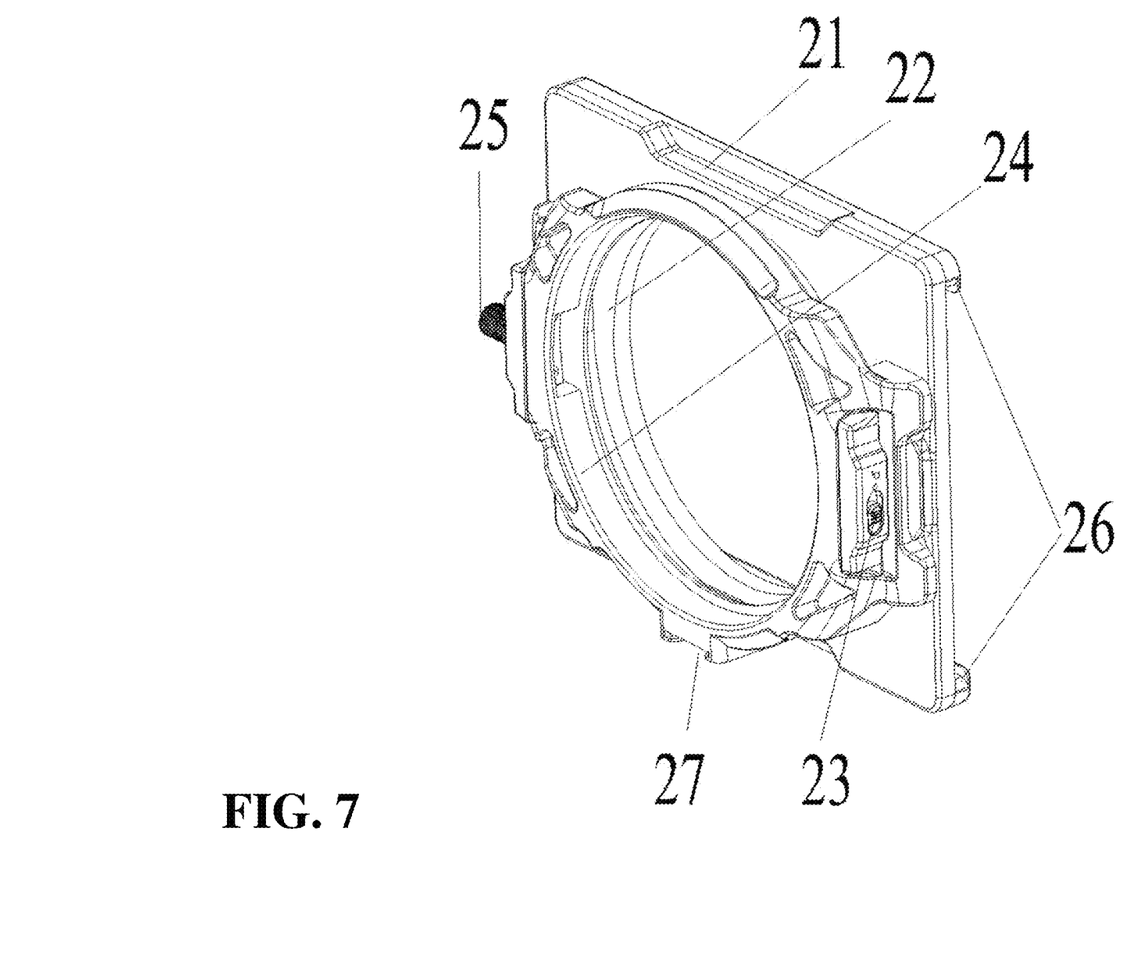
FIG. 7 is a drawing illustrating a perspective view of a filter holder according to one aspect.

In one aspect, the filter holder 2 includes a first cavity 22 for removably receiving the adjustable filter 3, a clasp 23, a second cavity 24 for removably receiving the changeable lens adapter 6, a thumbscrew 25, filter slots 26, and a cold shoe interface 27. The adjustable filter 3 can enter the first cavity 22 through an opening on the upper portion of the first cavity 22. Once the adjustable filter 3 is fully in place in the first cavity 22, the clasp 23 can be operated to fasten and secure the adjustable filter 3 in the first cavity 22. The clasp 23 can also be operated to loosen and release the adjustable filter 3 from the first cavity 22.

In one aspect, the filter holder 2 can hold a non-adjustable filter (e.g., rectangular filter 8) using the filter slots 26. The non-adjustable filter provides a fixed optical effect that cannot be adjusted. Some examples of the rectangular filter 8 are UV filters, polarizing filters, neutral density (ND) filters, colored filters, special effect filters, etc. The rectangular filter 8 can slide into the filter slots 26 in a horizontal direction. In one aspect, one or both filter slots 26 may have an elastic member (e.g., a rubber or plastic gasket/guide) that provides a flexible interface between the rectangular filter 8 and the filter slots 26. The elastic member can apply a consistent pressure against the rectangular filter 8 to prevent the rectangular filter 8 from shaking or falling off the filter slots 26. With the filter slots 26 and the first cavity 22, the filter holder 2 can accommodate two filters in the same matte box that provide more flexibility during shooting.

In one aspect, the filter holder 2 removably receives the changeable lens adapter 6 in the second cavity 24. The changeable lens adapter 6 connects the matte box to a camera lens 7. In one aspect, the changeable lens adapter 6 serves as a connector in the middle between the camera lens 7 and the matte box when the two are coupled together. A first end of the changeable lens adapter 6 can be inserted into the second cavity 24 of the filter holder 2 in an axial direction of the cavity. The outside diameter of the first end of the lens adapter 6 can be slightly smaller than the inside diameter of the second cavity 24 to facilitate ease of installation. Once the first end of the lens adapter 6 is positioned in the second cavity 24, the thumbscrew 25 can be operated (e.g., rotated in a clockwise direction) to secure the lens adapter 6 in the cavity. A second end (camera lens end) of the lens adapter 6 can have a thread 61 (e.g., external thread) that matches a thread (e.g., an internal thread) of the camera lens 7. To connect the lens adapter 6 with the camera lens 7, the threaded end of the lens adapter 6 is screwed into the internal thread of the camera lens 7 in the axial direction of the camera lens 7. The changeability of the lens adapter 6 allows the matte box to be coupled with a wide selection of lenses by changing the lens adapter with different thread designs. It is also contemplated that the lens adapter 6 can connect to a camera lens using other mechanical interfaces that are different from threads.

In one aspect, the cold shoe interface 27 may be provided at the lower part of the filter holder 2 to allow external devices and accessories to be physically attached to the filter holder 2. In some aspects, the filter holder 2 may provide other suitable accessory interface(s) for connecting various external devices and accessories.

Figure 3:
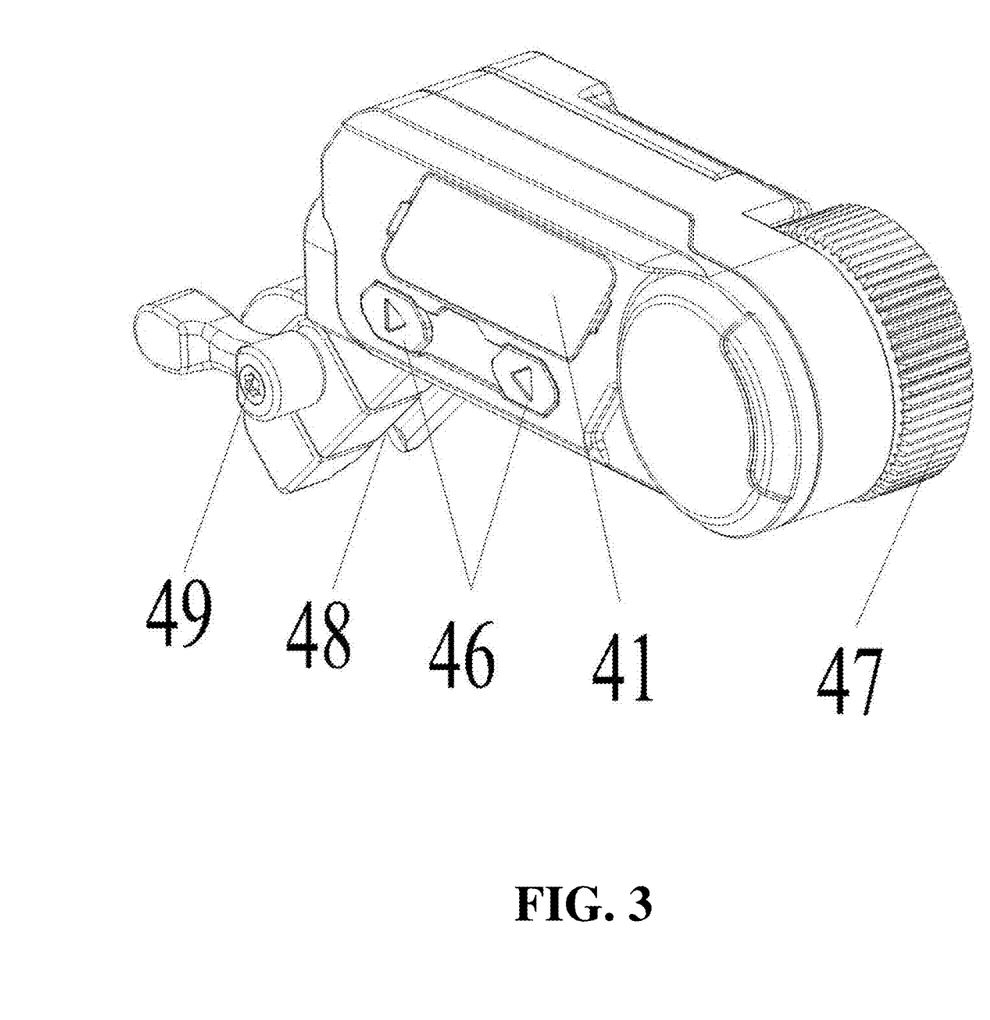
FIG. 3 is a drawing illustrating a first perspective view of an electrical filter control module according to one aspect.
Figure 4:
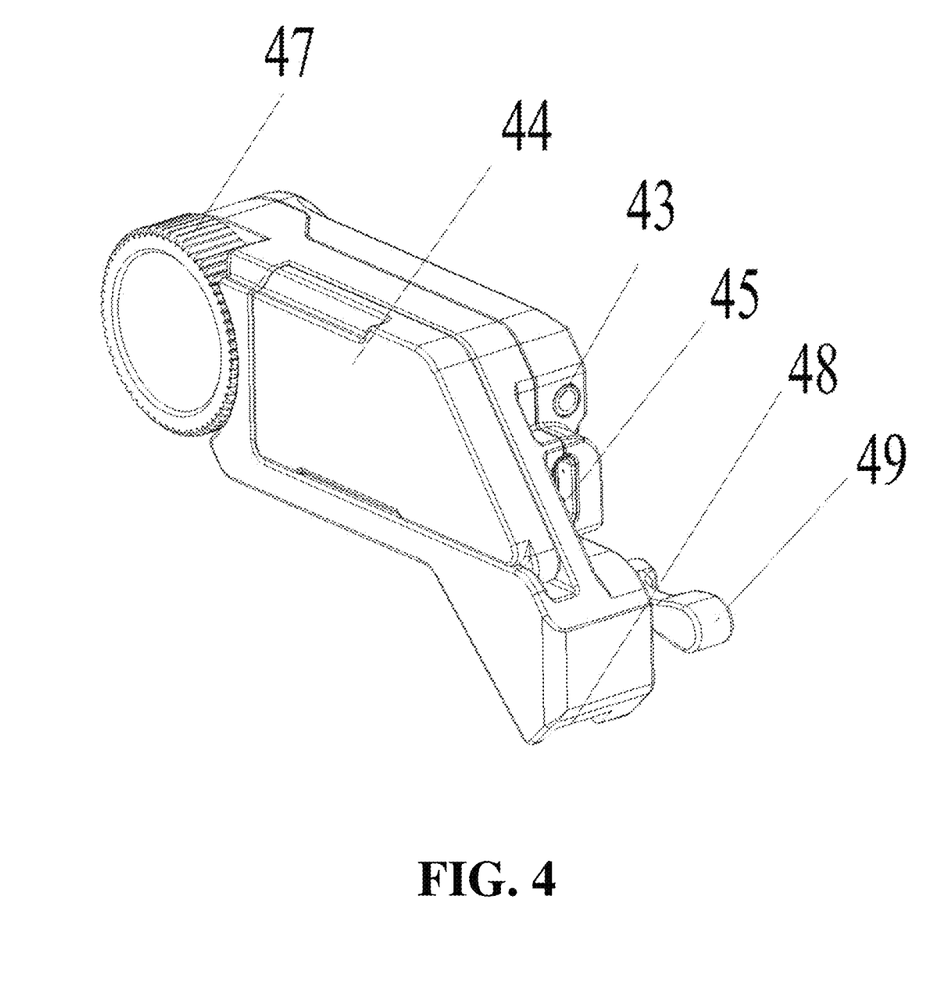
FIG. 4 is a drawing illustrating a second perspective view of the electrical filter control module.
Figure 5:
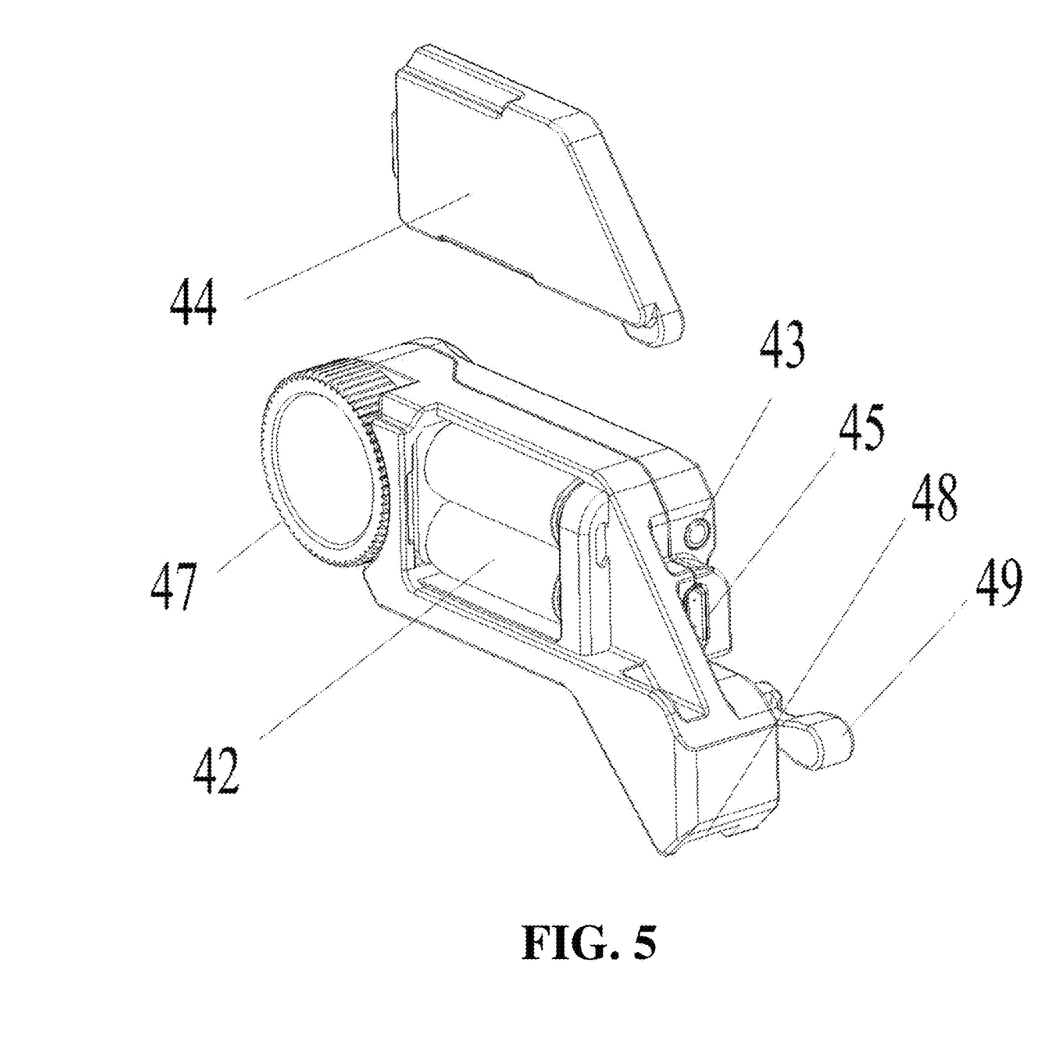
FIG. 5 is a drawing illustrating a third perspective view of the electrical filter control module.

In one aspect, the electrical filter control module 4 is configured to control and adjust the adjustable filter 3 in the filter holder 2. In one example, the electrical filter control module 4 includes various components, for example, a power supply portion, a control portion, an image display (e.g., an image display area 41), a motor output portion, and a connection portion. The filter control module 4 has a case that houses some or all of its components. The power supply portion may include a battery 42 (e.g., a rechargeable battery), a DC power interface 43, a battery cover 44, and a wired control interface 45. The control portion may include a controller and a communication interface. The communication interface may include a wireless communication interface and/or a wired control interface 45. The control portion may include a user interface (e.g., control buttons 46). The electrical filter control module 4 further includes a motor output 47 that can rotate, for example, in clockwise and counter-clockwise directions. The motor output 47 may be driven by or a part of a motor controlled by the control portion. The motor output 47 may have an external gear that can mesh with another gear such that the motor output 47 can transfer mechanical power to another device (e.g., adjustable filter 3). In one aspect, the connection portion may include a dovetail chute 48 and a twist fastener 49.

Figure 6:
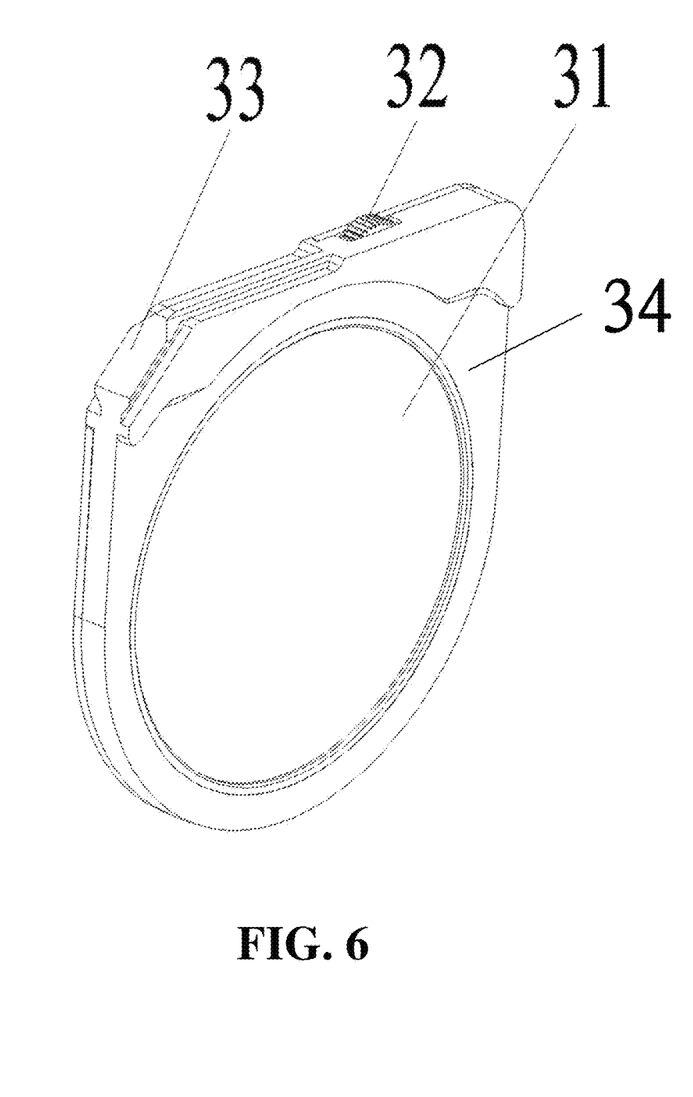
FIG. 6 is a drawing illustrating a perspective view of an adjustable filter according to one aspect.

In one aspect, the adjustable filter 3 includes a filter element 31, a gear transmission mechanism 32, and a housing 34 with a dovetail slide 33. An example of the filter element 31 is a polarizing filter or any filter that can achieve the desired image effects. The gear transmission mechanism 32 is at least partially contained in the housing 34 and is configured to control the rotation and/or angle of the filter element 31 to obtain the desired image effect at different angular positions. For example, the gear transmission mechanism 32 may have an exposed gear that can be used to rotate the filter element 31. The dovetail slide 33 provides a mechanical interface or mounting point for removably mounting an external device on the adjustable filter 3.

The electrical filter control module 4 can be mounted on the adjustable filter 3 by interlocking the dovetail chute 48 and dovetail slide 33. For example, an open end of the dovetail chute 48 can slide onto the dovetail slide 33 of the adjustable filter 3, such that the electrical filter control module 4 rests on top of the adjustable filter 3. The gear of the motor output 47 engages and the exposed gear of the gear transmission mechanism 32 of the adjustable filter 3 such that the motor output 47 can turn or rotate the filter element 31. The exposed gear of the gear transmission mechanism 32 may be rotatably connected to the filter element 31 directly or through one or more intervening gears.

The twist fastener 49 can be operated (e.g., rotated) to fasten the electrical filter control module 4 with the adjustable filter 3. For example, the twist fastener 49 when rotated in a clockwise direction can increase the friction between the dovetail chute 48 and dovetail slide 33 to secure the assembly. In one aspect, the electrical filter control module 4 can be controlled remotely using a wireless module embedded in the electrical filter control module 4. In one aspect, the electrical filter control module 4 can be controlled through the wired control interface 45. In one aspect, the user interface (e.g., the image display area 41 and control buttons 46) can be used to configure and control various operational parameters of the electrical filter control module 4, for example, wired or wireless control parameters, motor output control parameters, etc.

Figure 9:
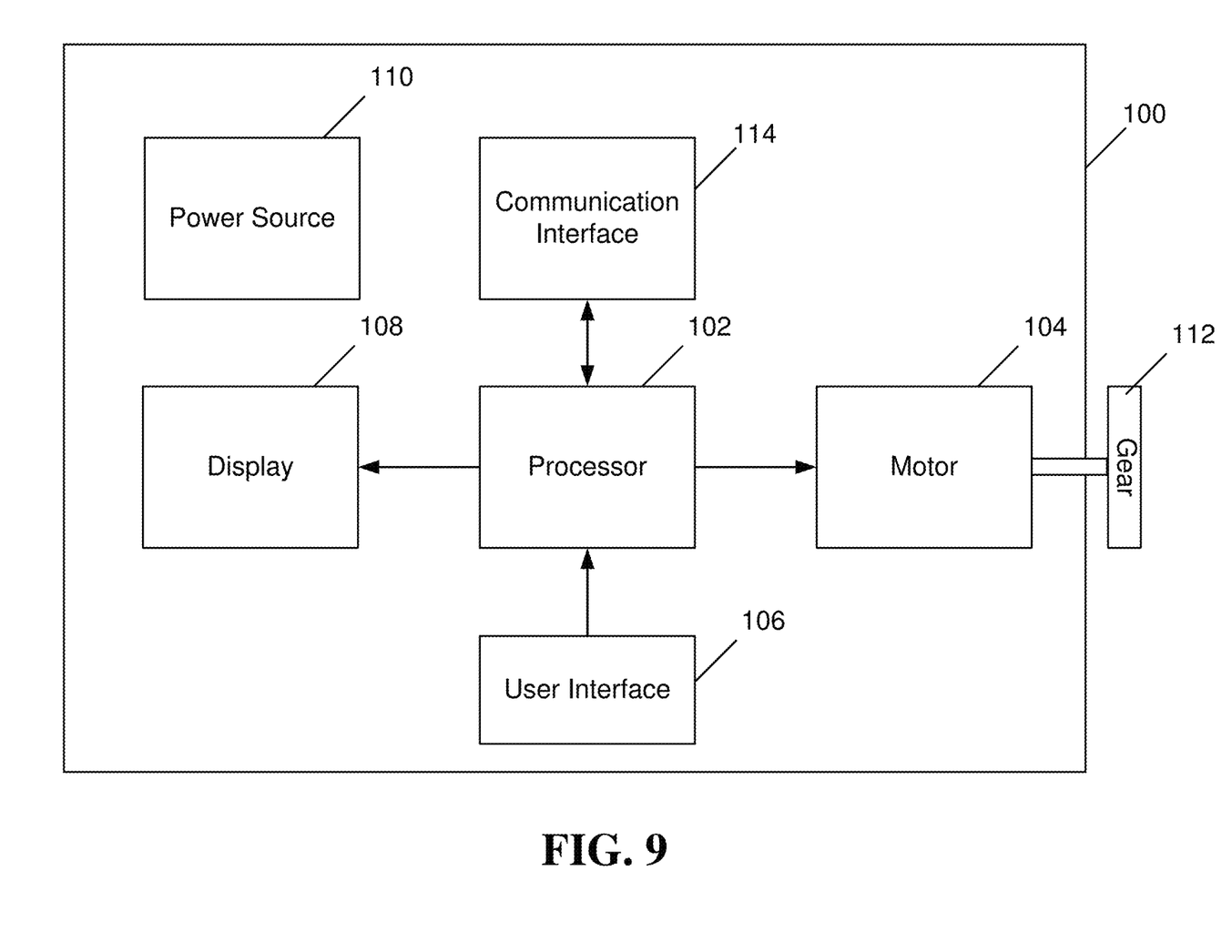
FIG. 9 is a drawing conceptually illustrating exemplary components of the electrical filter control module according to one aspect.

FIG. 9 is a drawing conceptually illustrating exemplary components of the electrical filter control module 100 according to one aspect. In one example, some or all of the components of the electrical filter control module 100 may be included in the electrical filter control module 4 described above. The electrical filter control module 100 includes a processor 102, a motor 104, a user interface 106, a display 108, and a power source 110. The power source 110 provides power to operate the electrical filter control module 100, including the processor 102, motor 104, user interface 106, and display 108. In some examples, the power source 110 may be a battery (e.g., removable battery 42). In some examples, the power source 110 may be an external power source (e.g., DC power source) that is not included in the electrical filter control module 100.

Examples of the processor 102 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 102 is operatively coupled with the motor 104, user interface 106, and display 108. The processor 102 may receive commands from the user interface 106. The commands may include commands for controlling the motor 104 to turn or rotate the motor output 112 (e.g., motor output 47). In one example, the motor output may be a gearwheel that can mesh with the exposed gear (e.g., gear transmission mechanism 32) of the adjustable filter 3. The user interface 106 may include components or circuitry configured to receive control commands from an external source via a communication interface 114. The communication interface 114 may include a wired communication interface (e.g., a digital data interface, USB, Firewire, Lightning, PCI, I2C, SMB, etc.) and/or a wireless communication interface (e.g., Bluetooth, Wi-Fi, cellular, etc.). The user interface 106 may include one or more buttons (e.g., buttons 46) or the like for receiving user inputs for configuring and/or controlling the electrical filter control module. In one aspect, the display 108 may be the display area 41 that can display various information (e.g., control parameters) of the electrical filter control module 4. Examples of the display 108 include a liquid crystal display (LCD), an organic light-emitting diode display (OLED), an electronic ink display, etc.

Figure 10:
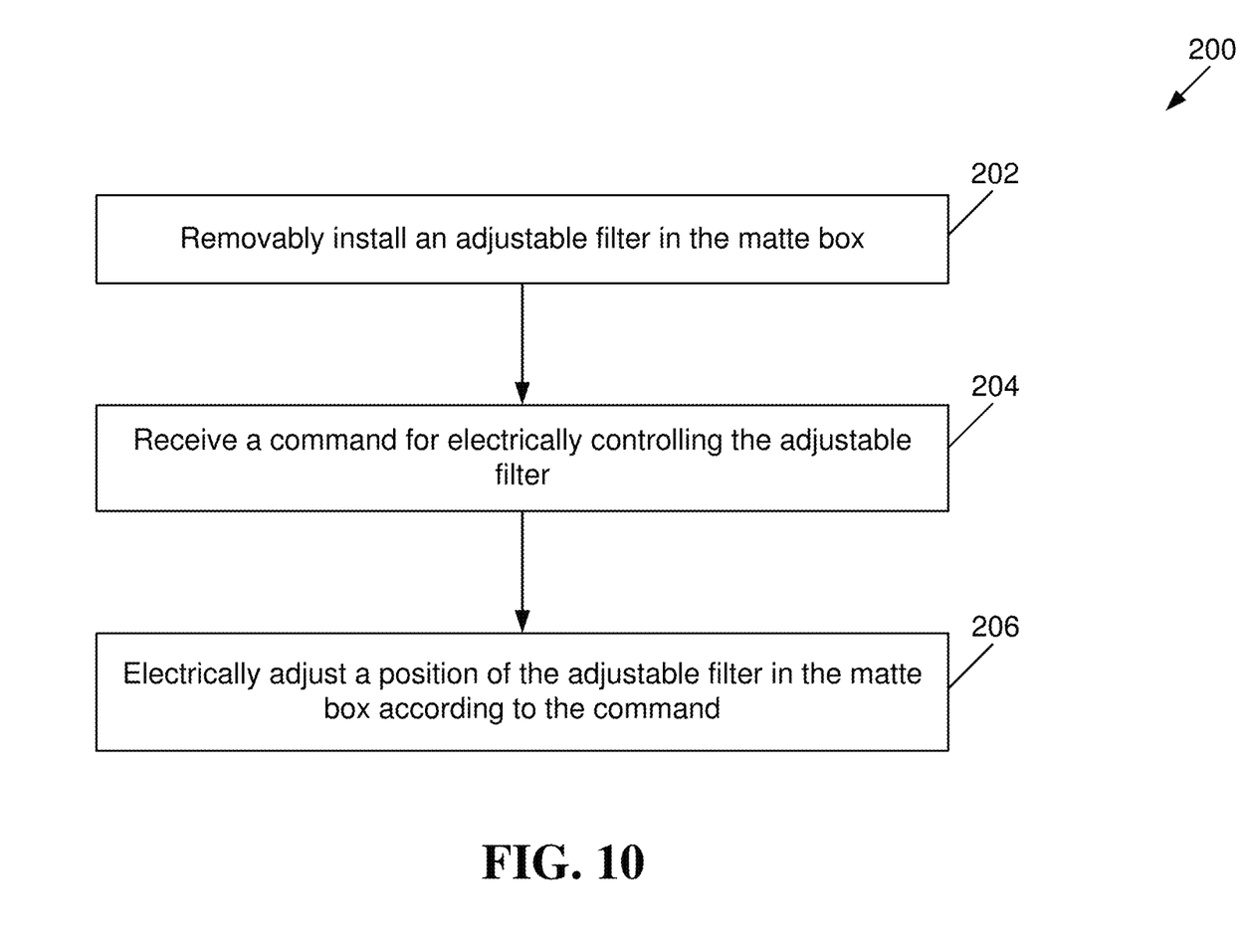
FIG. 10 is a flow chart illustrating a method of operating a camera matte box according to one aspect.

FIG. 10 is a flow chart illustrating a method 200 of operating a camera matte box according to one aspect. In one example, the method 200 can be used to operate the camera matte box described above in relation to FIGS. 1-9. At block 202, the adjustable filter 3 is removably installed in a matte box, for example, in the first cavity 22 of the filter holder 2. At block 204, the matte box receives a command for electrically controlling the adjustable filter. For example, the matte box has an electrical filter control module 4 that receives the command using a wired or wireless communication interface 114. At block 206, the electrical filter control module 4 can electrically adjust a position of the adjustable filter in the matte box according to the command. For example, the electrical filter control module 4 can rotate the adjustable filter 3 by a predetermined degree.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A camera matte box comprising:
    a body of the camera matte box;
    an adjustable filter removably mounted in the body of the camera matte box; and
    an electrical filter control module configured to adjust a position of the adjustable filter of the camera matte box;
    a filter holder removably attached to the body of the camera matte box, holding the adjustable filter in a cavity of the body; and
    a lens adapter removably connecting the filter holder to a camera lens,
    wherein the body comprises:
        a retainer on a first side of the body; and
        at least one lock on a second side of the body opposite the first side, wherein the retainer and the at least one lock together secure the filter holder in the body.

2. The camera matte box of claim 1, wherein the filter holder removably holds a non-adjustable filter in the body, wherein the adjustable filter and the non-adjustable filter are aligned in an axial direction toward the camera lens.

3. The camera matte box of claim 1, wherein the lens adapter has a first end and a second end, the first end removably received in a cavity of the filter holder, and the second end comprising an external thread for coupling with an internal thread of the camera lens.

4. The camera matte box of claim 3, wherein the filter holder comprises a fastener operable to fasten the first end of the lens adapter in the cavity of the filter holder.

5. The camera matte box of claim 1, wherein the electrical filter control module comprises:
    a controller;
    a motor controlled by the controller; and
    a motor output driven by the motor to adjust the position of the adjustable filter.

6. The camera matte box of claim 5, wherein the electrical filter control module further comprises:
    a user interface for configuring at least one parameter of the electrical filter control module.

7. The camera matte box of claim 5, wherein the motor output is rotatably coupled to the adjustable filter.

8. The camera matte box of claim 7, wherein the motor output comprises a gear that meshes with a gear of the adjustable filter.

9. The camera matte box of claim 1, further comprising:
    at least one flap removably and rotatably attached to the body, the at least one flap configurable at a plurality of angles with respect to the body to block light from entering the camera matte box.

10. A camera matte box comprising:
    a body of the camera matte box;
    an adjustable filter removably mounted in the body of the camera matte box; and
    an electrical filter control module configured to adjust a position of the adjustable filter of the camera matte box,
    wherein the electrical filter control module is slidably connected with the adjustable filter.

11. An adjustable filter of a camera matte box, comprising:
    a housing removably installed in the camera matte box;
    a filter element rotatably installed in the housing; and
    a gear transmission mechanism at least partially contained in the housing, the gear transmission mechanism rotatably coupled to the filter element for adjusting a position of the filter element,
    wherein the housing comprises a mechanical interface for removably connecting with an electrical filter control module that is configured to rotate the filter element using the gear transmission mechanism.

12. The adjustable filter of claim 11, wherein the gear transmission mechanism comprises a gear that is at least partially exposed outside of the housing.

* * * * *